Patented Nov. 6, 1923.

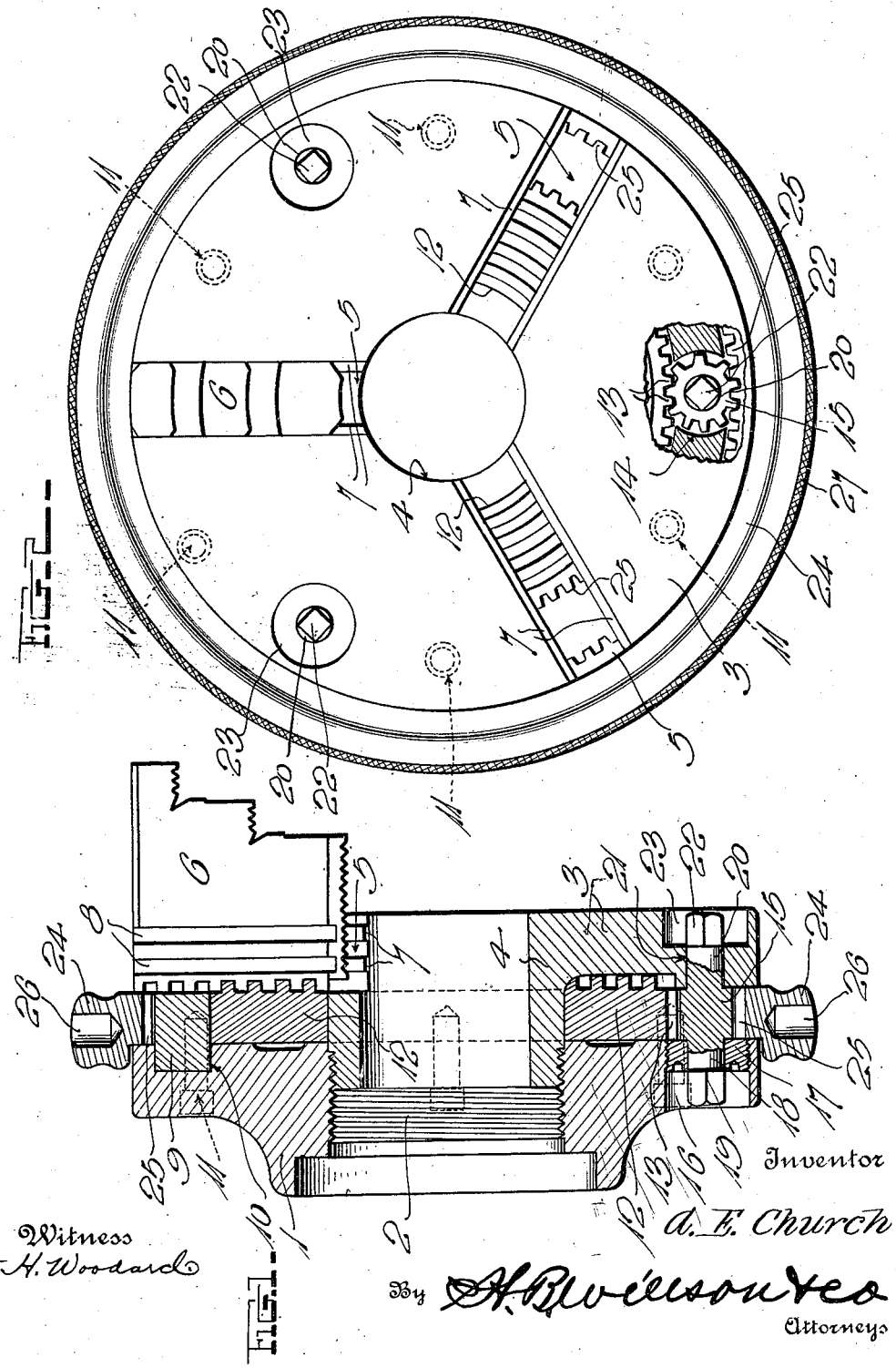

1,473,464

UNITED STATES PATENT OFFICE.

ALBERT E. CHURCH, OF NEW BRITAIN, CONNECTICUT.

CHUCK.

Application filed November 16, 1922. Serial No. 601,372.

*To all whom it may concern:*

Be it known that I, ALBERT E. CHURCH, a citizen of the United States, residing at New Britain, in the county of Hartford and State of Connecticut, have invented certain new and useful Improvements in Chucks; and I do declare the following to be a full, clear, and exact description of the invention, such as will enable others skilled in the art to which it appertains, to make and use the same.

My invention relates to lathe chucks of the scroll type. It is common in the art, to mesh a plurality of pinions with gear teeth on the periphery of the scroll, and to provide an annulus or gear ring surrounding the series of pinions and meshing therewith for rapidly rotating said pinions to adjust the scroll, but by the provision of this speed increasing means, power is of course sacrificed and consequently the chuck jaws do not grip the work as tightly as is often desirable. In another form of chuck, well known to the art, a series of pinions mesh with the gear teeth on the periphery of the scroll and are accessible for turning to operate said scroll. This form of chuck possesses ample power for tightly gripping the work in the chuck jaws, but lacks the speed of the first mentioned type, having the annulus for rapidly rotating the pinions.

It is the object of my invention to provide a new form of chuck which may be considered an improvement of the type first mentioned, in that it employs the scroll, pinions, and peripheral ring for obtaining speed adjustment of the jaws, and also has the pinions mounted so that they are accessible for turning, to permit the scroll and jaws to be forcibly operated, to tightly grip the work. Thus, the advantages of both types of chucks, above referred to, are combined in a single structure.

With the foregoing in view, the invention resides in the novel subject matter hereinafter described and claimed, the description being supplemented by the accompanying drawing:

Figure 1 is a vertical longitudinal sectional view of the chuck constructed in accordance with my invention.

Fig. 2 is a front elevation, partly broken away and in section.

In the drawings above briefly described, the numeral 1 designates a circular back plate which is shown as provided with internal screw threads 2 for engagement with the usual threads on a lathe spindle, it being understood however, that if desired, other provision could be made for mounting and driving this plate. A circular front plate 3 is spaced from the plate 1 and is provided with a rearwardly extending hub 4 which is threaded into the plate 1 or otherwise suitably connected thereto, said plate 3 being provided with suitable radial guide-ways 5 for jaws 6 of any desired or well known form, each guide-way being preferably formed with two parallel ribs 7 for reception in grooves 8 in opposite sides of the jaws, permitting the use of the "universal jaw" which has been shown, a "reversible top jaw," or a "combination universal and independent jaw."

The front plate 3 is provided with a flange 9 concentric with the axis of the chuck, said flange abutting and being received in a groove 10 in the front face of the plate 1. I have shown screws 11 threaded through the back plate 1 into the flange 9 for rigidly tying the front and back plates together in properly spaced relation.

A scroll 12 surrounds the hub 4 between the front and back plates 3 and 1 and is provided at its outer edge with gear teeth 13 in running contact with the inner side of the flange 9. At circumferentially spaced points, this flange is recessed as indicated at 14 to receive pinions 15 having their axes parallel with the axis of the chuck. In the construction shown, the pinions are insertable into the recesses 14 through openings 16 formed in the rear or back plate 1, being retained in place by suitable rings 17 threaded in said openings 16. Each pinion 15 is provided with a rearwardly extending trunnion 18 having squared ends 19 located in the opening 16 and said pinion is also provided with a forwardly extending trunnion 20 received rotatably in an opening 21 in the front plate 3, the free end of the trunnion 20 being squared as indicated at 22 and located within a counter-sink 23 in said plate 3. It will thus be seen that a suitable key may be engaged with either of the trunnions of any pinion, for the purpose of rotating the same, causing forcible turning of the scroll 12 to apply the jaws 6 with great pressure.

An operating ring 24 surrounds the flange 9 between the outer portions of the plates 1 and 3 and is provided at its inner edge with gear teeth 25 meshing with the pinions 15. At least the outer edge, but preferably the greater part of the ring 24, is exposed at the periphery of the chuck so that it may be hand operated to rapidly rotate the pinions 15 and scroll 12, for the purpose of quickly engaging the jaws with the work or moving them away from the latter. I prefer to provide the ring 24 with radial sockets 26 to receive the end of a suitable tool which may be used for rotating the ring 24. It will be seen however that this ring may also be gripped by hand and turned, for which purpose it is preferably knurled as indicated at 27.

By employing the construction shown or a substantial equivalent thereof, a chuck is provided which will be highly advantageous, it being possible to rapidly operate the chuck by means of the ring 24 and to more forcibly contract or expand the jaws by applying a key or the like directly to one of the trunnions of any of the pinions 15.

As excellent results may be obtained from the details disclosed, these details are preferably followed. However, within the scope of the invention as claimed, numerous minor changes may be made.

I claim:—

A chuck comprising a jaw-carrying head, a jaw-operating scroll in said head having gear teeth, a hand-rotated annulus carried by said head, said annulus being concentric with said scroll and also having gear teeth, and a single set of pinions mounted in the head and exposed for direct operation, said pinions meshing with the gear teeth of the scroll to forcibly turn the latter when any of said pinions is directly operated and also meshing with the teeth of said annulus for rapidly rotating the scroll when said annulus is turned.

In testimony whereof I have hereunto affixed my signature.

ALBERT E. CHURCH.